April 18, 1939.     J. STEINDEL     2,155,206
PNEUMATIC TIRE
Filed May 6, 1937     3 Sheets-Sheet 1
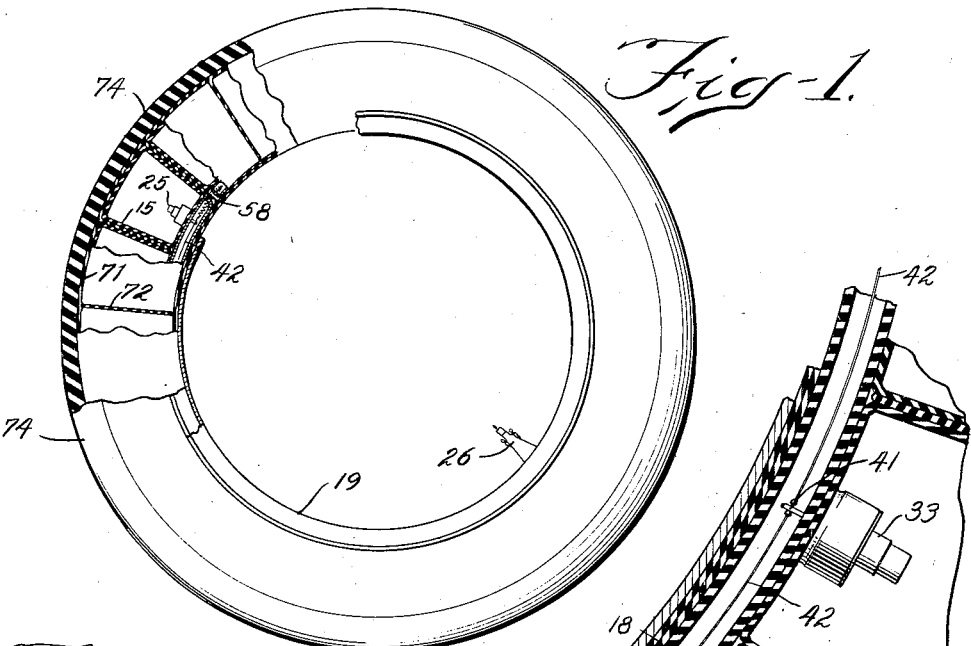
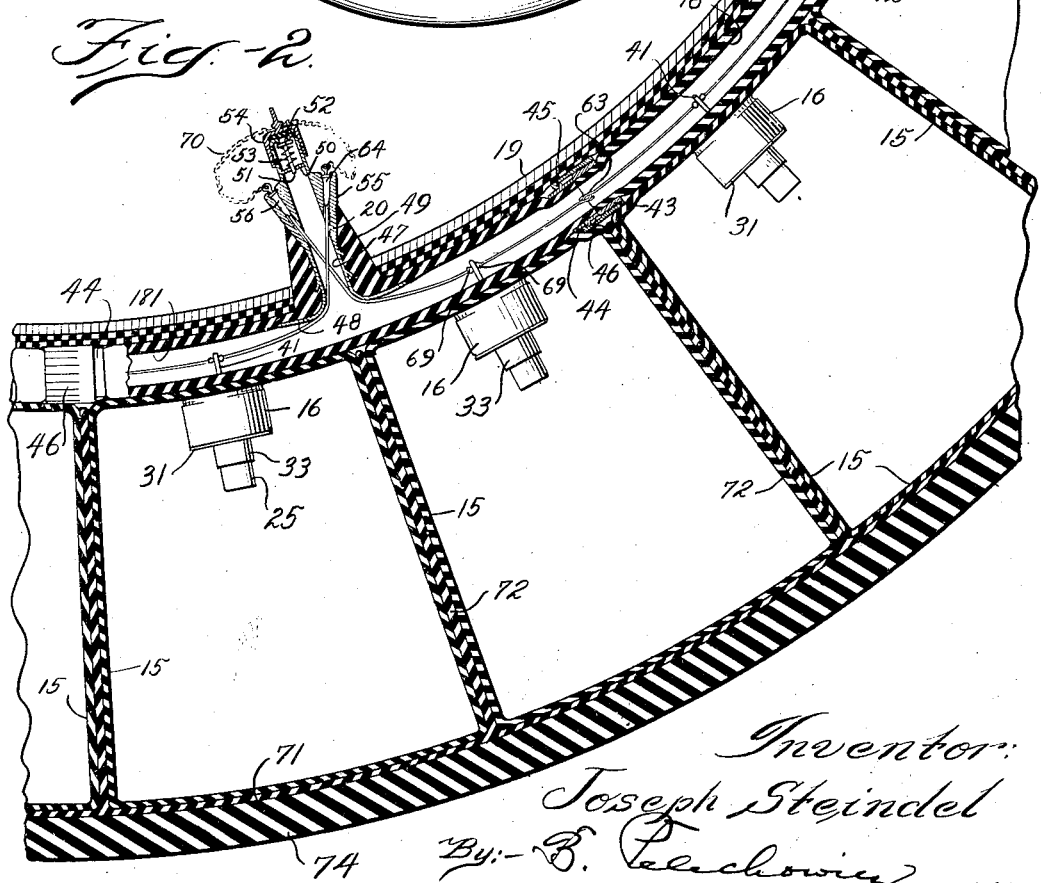
Inventor:
Joseph Steindel
By:— B. Pluchowicz Atty.

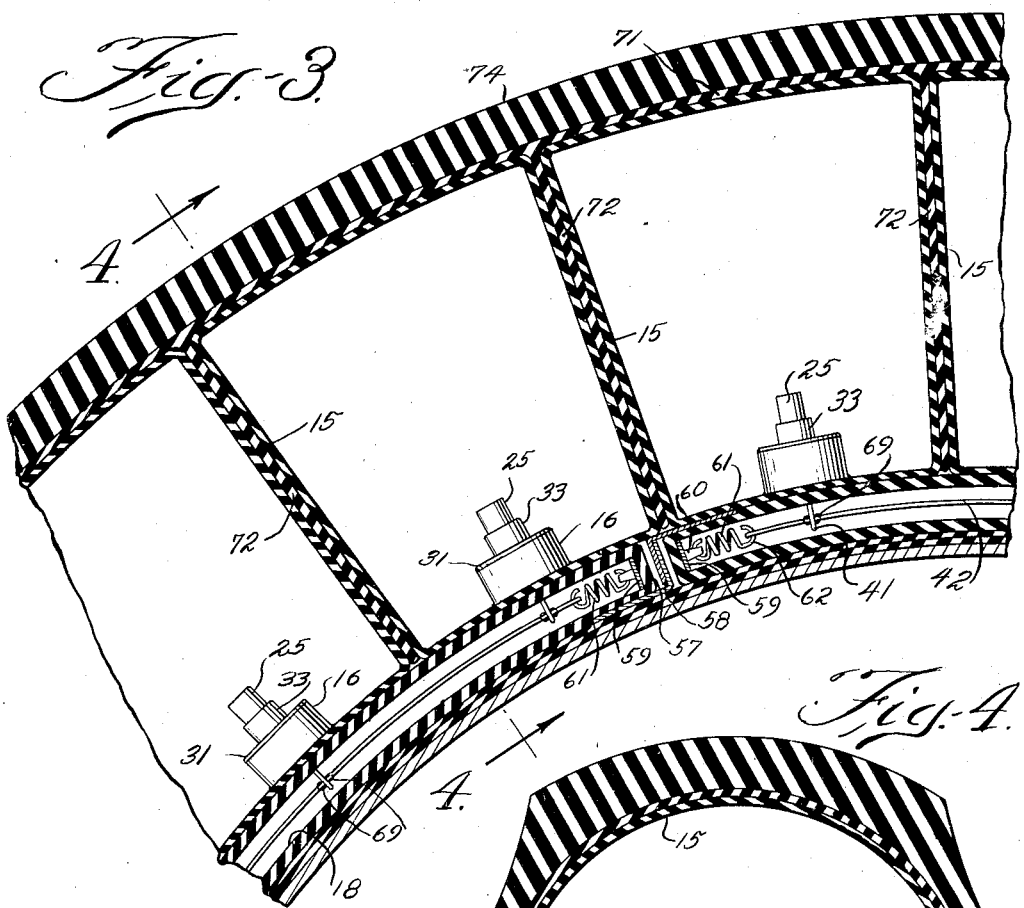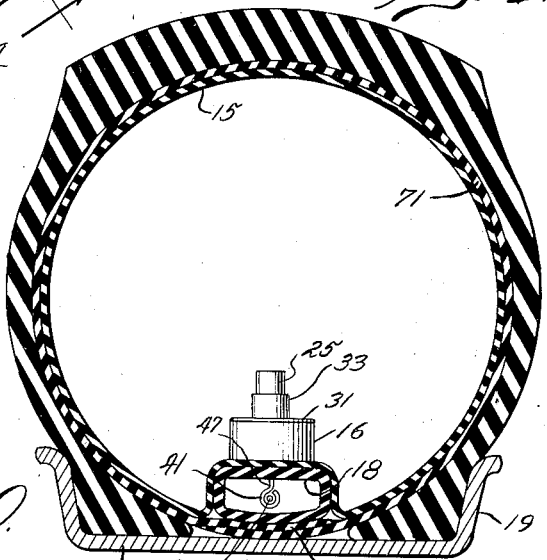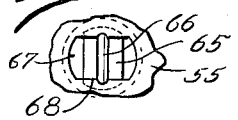

April 18, 1939. J. STEINDEL 2,155,206
PNEUMATIC TIRE
Filed May 6, 1937 3 Sheets-Sheet 3

Inventor
Joseph Steindel
By B. Telechowitz
Att.

Patented Apr. 18, 1939

2,155,206

UNITED STATES PATENT OFFICE 2,155,206

PNEUMATIC TIRE

Joseph Steindel, East Chicago, Ind.

Application May 6, 1937, Serial No. 141,101

5 Claims. (Cl. 152—338)

The present invention relates to automobile tires and has for its main object the provision of an inner tube consisting of a plurality of inflatable cell units whereby the puncturing of one cell unit would not deflate the entire tire.

A still further object of the present invention is the provision of an inner tube for an automobile tire, including a plurality of inflatable cell units, each provided with a valve through which inflation may be had and which do not permit deflation of the cell units until the valves are opened.

A still further object of the present invention is the provision of an inner tube for an automobile tire, comprising a plurality of inflatable cell units which remain in communication with an air tube through the medium of suitable valves, through which valve inflation of the cell units may be had through said tube, and manually operable means within said tube for deflating the cell units.

A still further object of the present invention is the provision of a suitable valve in connection with an inflatable cell unit for automobile tires of the character above indicated.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views;

Fig. 1 is a side view, on a reduced scale, partly in elevation and partly in section, of an automobile tire embodying the present invention;

Fig. 2 is a fragmentary, longitudinal, cross-sectional view through a portion of an automobile tire embodying the present invention;

Fig. 3 is a similar view at the substantially diametrically opposite portion of the tire;

Fig. 4 is a transverse, cross-sectional view through the tire, on line 4—4 of Fig. 3;

Fig. 9 is an end elevational view of locking means between the body of main valve and the end of a wire by means of which the inflatable cell unit valves may be opened to deflate the units;

Fig. 10 is an elevational view, partly in section, of the said end of wire; and

Fig. 11 is an elevational, end view, partly in section, of the end termination of said wire.

Referring in detail to the present drawings the preferred form of the invention illustrated on Figs. 1, 2, 3 and 4 includes an inner tube composed of a plurality of rubber cell units 15, which, when suitably arranged in an annular formation are complementary of the inner tube of an automobile tire, while on transverse cross-section, as seen on Fig. 4, each of said cell units 15 is of round formation.

Figure 6:
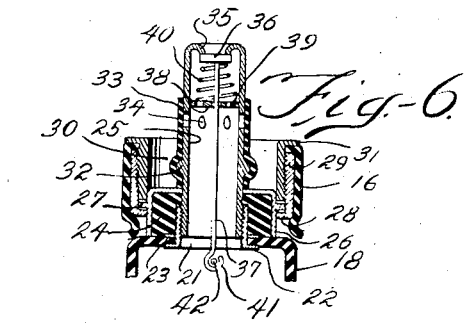
Fig. 6 is an enlarged, vertical cross-sectional view through the valve co-operating with one inflatable cell unit, the view having been taken on line 6—6 of Fig. 5.

Each of said cells 15, adjacent its lower or inner end is provided with an inwardly extending neck 16, which by its inner end is adapted to be engaged by the valve mechanism of valve generally indicated by 25 and illustrated in detail on Fig. 6.

The invention further includes an air tube 18, which is substantially rectangular on transverse cross-section and is positioned adjacent the inner ends of cells 15 and near the wheel frame 19. Said tube 18 communicates with valve 20 which is set upon said tube 18 and extends into the wheel through frame 19. Air forced through valve 20 will pass into tube 18 and from there into cells 15 through valves 25 for the purpose of inflating said cells 15.

Referring to the cell valves 25 each of them embodies an inwardly threaded sleeve 21 having an integrally formed flange 22 outwardly projecting from said sleeve 21 and from its lower end. Tube 18 at its outward wall is provided with a plurality of circular openings adjacent each of said cells 15 within which said sleeve 21 is receivable. Said flange 22 is vulcanized or in any other suitable manner attached to the underface of said wall of said tube 18 and adjacent said circular opening. Positioned around said sleeve 21 is a washer 23 overlying the portion of the outer wall of said tube 18 and impinging the same in co-operation with said flange 22 for the purpose of providing an air tight fit between said tube 18 and said sleeve 21.

For further providing an air tight fit between tube 18 and each of said valves 25, a collar 24 made of hard rubber is positioned over said washer 23 and the adjacent periphery at the outer end of sleeve 21 and contacts with tubular valve stem 25. Said collar 24 may be vulcanized to the washer 23, the adjacent portion of the outer wall of tube 18, to the outer periphery of sleeve 21 and to the contacting portion of the stem 25. Said stem 25 at its inner or lower end is externally threaded to engage the inner threads of sleeve 21, as is clearly seen on Fig. 6. Thus it will be seen that through the medium of sleeve 21 said stem 25 rigidly connects with tube 18.

The valve mechanism further includes an inverted metallic cup 26 enclosing rubber collar 24. Said cup 26 has a circular opening at its outer wall through which stem 25 projects.

The peripheral wall of said cup 26 is provided with an annular flange or ferrule 27 which provides a shoulder against which annular flange 28 made at one end of sleeve 29 is adapted to bear against. Said sleeve 29 is inwardly threaded to receive therewithin in threaded engagement another sleeve 30 which is adapted by one of its ends to bear against the opposite face of flange 27.

Said latter sleeve 30 at its opposite or inner end is provided with an outwardly extending flange 31 and overhangs the edge of the mouth of neck 16 of cell 15. Said edge is impinged between the inner end of sleeve 29 and said flange 31 whereby an air tight connection is had between the valve and said cell 15 for preventing escaping of air from cell 15 when the same is inflated.

The valve stem tube 25, being in engagement with sleeve 21, extends inwardly of the cell 15. Substantially centrally of said valve stem 25 the same has a peripheral ferrule 32. Tube 33 made of pliable rubber is inserted over said stem 25 and over said ferrule 32, whereby said tube 33 may be held in position upon said valve stem 25. Said stem 25 has a plurality of air vents 34 which are normally closed by said rubber tube 33.

The outer inner end of stem 25 is inwardly bent as at 35 to define a constricted mouth which is normally closed by stopper 36. Said stopper is set upon rod 37 which extends within said stem 25 and normally remains in a longitudinal central position with respect to said stem 25. The outer or upper end of said rod 37 is affixed to said stopper 36. The valve further includes a disc 38 rigidly affixed within stem 25, said disc being provided with a plurality of air vents 39 for permitting passage of air for the purpose hereinafter stated. Said rod 37 loosely passes through a central opening made in said disc 38.

Set around the upper end of rod 37 and interposed between stopper 36 and disc 38 is a coil spring 40 which normally bears against stopper 36 for keeping the same in position against the mouth of the stem 25 for normally preventing the escape of air from cell 15 and through the valve stem 25.

The opposite end of rod 37 is provided with eye 41 which engages wire 42 for purposes hereinafter stated.

From the hereinabove description it will be seen that neck 16, extending inwardly into cell 15, skirts sleeve 29 and contacts therewith when cell 15 is inflated as clearly seen on Figs. 4 and 6.

Tube 18 is made of three sections, for the purpose of facilitating the manufacture and assembly thereof. Said tube 18 has two end sections and a valve section 18'. Said end sections are connected with valve section 18' of the tube by means of connections illustrated on Fig. 2 which connections include sleeve 43 externally threaded and outwardly set upon the adjacent ends of end sections of the tube. The adjacent ends of valve sections 18' of the tube are provided with sleeves 44 which are provided with annular flanges 45 which are engaged by a flange upon outer sleeve 46. The free end of said latter sleeve 46 is interiorly threaded to engage the threads upon sleeves 43. Since said sleeves 43, 44 and 46 are annular, the adjacent ends of tube sections are likewise formed into annular end terminations, although the remaining portions of the tube sections are rectangular on transverse cross-section.

Set in the inner face of the tube section 18' is valve, generally indicated by 20, through which air is pumped into tube 18. Said valve 20 includes a metallic tubular member 47 including an outwardly flaring flange 48, the latter being imbedded inwardly of the tube section 18'. Said tubular member 47 is further provided with a number of downwardly projecting prongs 49 which are imbedded within rubber tube integrally formed with tube section 18'. By this arrangement flange 48 prevents injury to the tube fabric by wire 42 which, by its two ends is extensible through said valve 20. Said tubular member 47 as well as the enveloping rubber fabric integrally formed with section 18' extends through wheel frame 19 within the automobile wheel.

Valve 20 is further provided with disc 50 rigidly set within the tubular member 47, which disc is provided with a plurality of apertures through which air may be passed into tube 18. Set within said disc is rod 51, which at its outer end is provided with stopper 52 which is adapted to contact with the inwardly flared mouth of tubular member 47 for preventing the escape of air. Coil spring 53 interposed between said stopper 52 and disc 50 and set upon rod 51 normally keeps the mouth of said tubular member 47 of the valve closed. Cap 54 which may be set upon the outer end of said valve 20 provides additional means for keeping said valve 20 closed and also prevents entrance of dirt and dust into tube 18 through said valve 20.

Tubular member 47 is provided with two integral enlargements or bulges 55, one on diametrically opposite side from the other upon the body of said tubular member 47 which enlargements are provided with tapered openings 56 communicating with tubular member 47 and tube 18 for the purposes hereinafter stated.

The opposite ends of tube 18 are sealed as at 57, and when said tube 18 is in operative position within the wheel said ends are at a point which is diametrically opposite from valve 20, as is clearly seen on Fig. 1. These sealed ends of tube 18 are held in relative position by interengaging hooks 58, one set and affixed to each end section of tube 18 as is clearly seen on Fig. 3.

Set within the adjacent sealed ends of tube 18 is a metallic member 59, each of which carries lug 60 to which one end of coil spring 61 is attached while the other end of each of said springs 61 engage the adjacent end of wire 42 as at 62.

It will be noted that wire 42 is made in two sections, one entering section of tube 18 on each side of valve 20. Opposite joint 46 the wire 42 forms a joint 63. The two wires 42 lead to tubular member 47 and cross therein, each end leading to opening within bulge 55. There each end of wire 42 is provided with a rubber stopper 64, and having passed through said rubber stopper 64, wire 42 connects with a substantially rectangular plate 65 which is provided on its outer face with an integrally formed eye 66. The bulges 55 on their outer end are provided with a substantially rectangular opening 67 and have an under-cut slot with the resulting flange 68 bordering on said opening 67. By virtue of this arrangement, when the stopper 64 is within its opening within bulge 55 upon imparting a manual pressure upon plate 65 and loop 66, said plate 65 will enter opening 56 and upon imparting a rotary twist to loop 66 said plate 65 upon making one-fourth of a revolution, will, by its longer ends, be shifted under flanges 68, all of which arrangement is clearly shown on Figs. 9, 10 and 11. By virtue of this arrangement there will be no possibility of air escaping through the openings made in the bulges 55 in valve 20.

Flange 48, being made of metal prevents injury to the adjacent tube section 18' by virtue of friction of the bent portions of wire 42, as the two sections thereof are being pulled through openings 56 in valve 20.

Wire 42 on each side of each eye 41 is provided with stoppers 69 for the purposes hereinafter stated.

Affixed to each eye 66 is chain 70, the opposite end of which is affixed to cap 54.

From the hereinabove description it will be seen that upon disconnecting cap 54 from valve 20 air may be forced into tube 18 through said valve, the pressure of the air compressed by the pump will depress stopper 52 against the tension of coil spring 53. The air forced into tube 18 will fill said tube 18 on both sides of said valve 20 and will thereupon enter each of said valve stems 25, wherein it will exert pressure upon rubber tube 33 through vents 34. Through these vents 34 the air will be forced past the outer periphery of valve stem 25 and the adjacent inner periphery of tube 33 into each of the air cells 15. Ferrule 32 upon valve stem 25 tends to keep said rubber tube 33 in proper position upon valve stem 25 during the process of inflation.

In the event one or more of the cells 15 is punctured and the air should escape therefrom, this will not affect the air in the remaining uninjured cells. There the air still will remain to keep the cells in an inflated condition, there being no possibility of air escaping through valves 25, since stoppers 36 keep the air within the cells and keep the air likewise from escaping through vents 34.

Stoppers 36 perform their intended function when it becomes necessary to deflate all the cells. When this becomes necessary, stoppers 64 and plates 65 upon the ends of wires 42 are disengaged from bulges 55 by imparting a twist to eyes 66 for the purpose of withdrawing plate 65 from opening 67. When said plates 65 are free from their engagement with the body of said bulges 55, thereupon stoppers 64 may be completely withdrawn from their respective openings within which they are positioned in bulges 55, it being observed that the diameter of said stoppers 64 being smaller than the smallest extent of plates 65, said stoppers consequently may be freely removed from their respective openings which they normally close, and may be withdrawn completely, when required, through openings 67. Thus, when manual pull is imparted upon wires 42 through the medium of chains 70 and eyes 66, the two sections of wire 42 will be longitudinally shifted within tube 18 and against the tension of springs 61. By this operation rod 37, which may be made of flexible metallic material, will likewise be shifted downwardly for the purpose of shifting stoppers 36 from their contact with constricted mouth of valve stem 25 for opening the same. When said stems 25 are opened, the air within cells 15 will be released through said stems 25, tube 18 and may be passed through openings 56 in valve 20. When stoppers 64 are reinserted in the openings in bulges 55, spring 61 will retract wire 18 to its normal, inoperative position, which operation will cause the closing of valves 25, springs 40, exerting pressure upon stoppers 36, bringing rods 37 to their original inoperative position.

To maintain said air cells 15 in their relative operative association, and also to further protect them against injury a cover tube 71 is provided which completely covers the sides of said air cells 15. Said covering tube 71 has transverse partition walls 72 which fill the spaces between each pair of adjacent cells 15. The inner edges of said tube cover 71 overlap each other as at 73 and are positioned beneath the inner face of tube 18, as is clearly seen on Fig. 4. Over said covering tube 71 shoe 74 is placed which engages frame 19 of the wheel in usual normal way. As a further modification, said cover tube 71 may be eliminated, and partition walls corresponding to partition walls 72 may be made in the shoe 74 itself, which partition walls in the said shoe may be positioned between each pair of adjacent cells 15 to fill the spaces therebetween.

Figure 5:
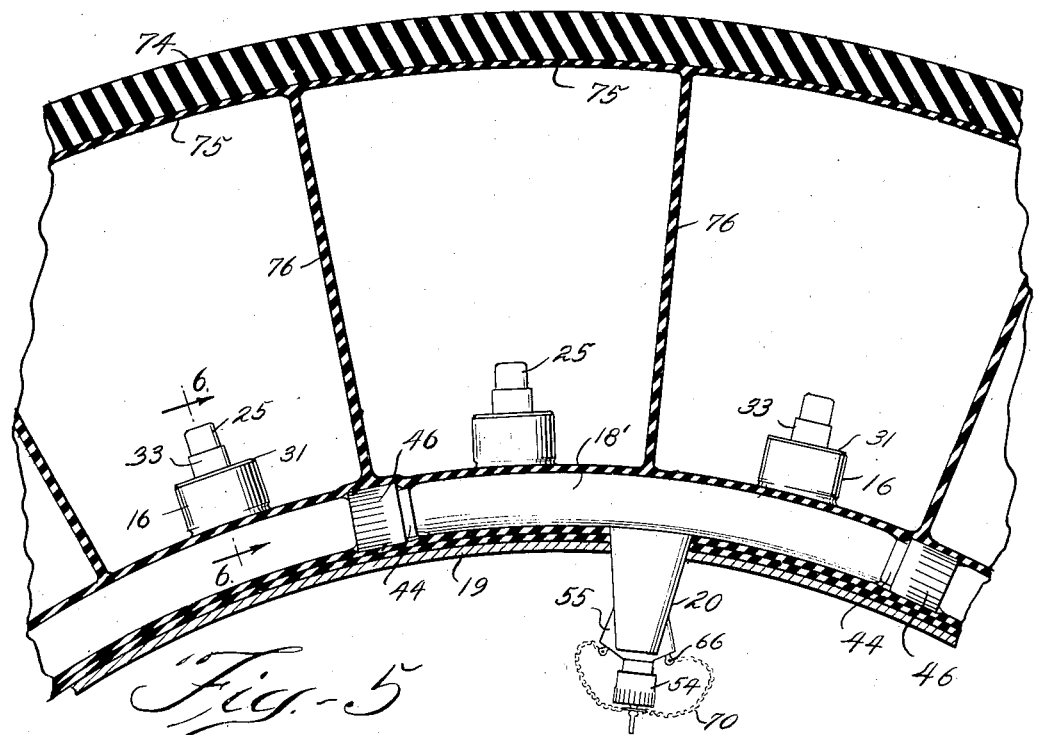
Fig. 5 is a longitudinal, cross-sectional view through a portion of an automobile tire illustrating a modified form of the invention.

Referring to Fig. 5, there is a modified form of invention, wherein air cells 15 are not made as separate units, but are formed in a tube 75 having transverse partition walls 76. The resulting pockets will form cells corresponding in all particulars with cells 15 shown in the preferred form of the invention. Said tube 75 may be made in two or more sections which would be complementary of the entire inner tube.

Figure 7:
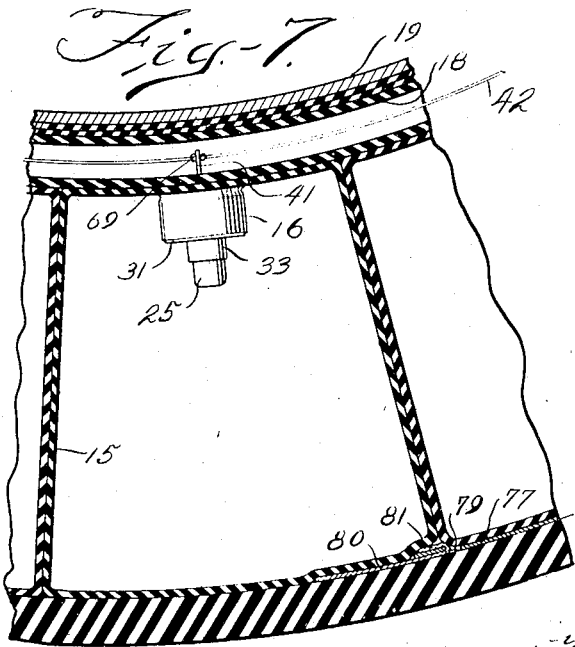
Fig. 7 is a longitudinal, cross-sectional view through a portion of a tire illustrating another modified form of the invention.
Figure 8:
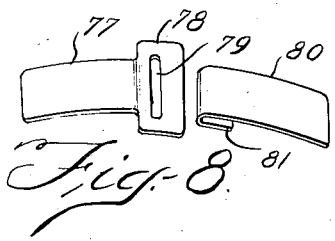
Fig. 8 is an elevational view of a clasp connection betwen the inflatable cell units used with the modified form of the invention illustrated in Fig. 7.

A further modification of the present invention is shown on Figs. 7 and 8 which modification includes inflatable cells 15 in all respects of the same construction as in the preferred form of the invention, with the exception that in the modified form of the invention, the tube covering 71 and partition walls 72 are eliminated, and the adjacent transverse walls of the cells 15 contact. For preventing any creeping movement of the air cells 15, displacement thereof, and consequent possible injury, the air cells, as shown on Fig. 7, are connected at their outer peripheral points by means of clasping eye and hook device shown on Fig. 8 which includes plate 77 with an integral extension 78 provided with slot 79.

The eye-portion of the clasp is attached to one air cell, while to the other adjacent air cell a hook-portion of the clasp, including body portion 80 and hook 81, is attached. Said hook 81 is adapted to enter slot 79 for engaging the eye-portion of the clasp.

While there is described herein a preferred embodiment of the present invention, it is nevertheless to be understood that minor changes may be made therein without departing from the spirit and scope of the invention as claimed.

What I claim as new is:

1. A pneumatic tire comprising a plurality of complementary inflatable cell units arranged in annular formation, means for inflating said units, and clasps in association with each pair of adjacent cell units for maintaining them in the arranged annular formation.

2. In a pneumatic tire including an inflatable cell unit, an inflation and deflation valve for said cell unit comprising a tubular stem extending into said unit and in an air tight connection therewith, said tubular stem being provided with a plurality of vents upon its peripheral wall, a resilient tubular member mounted upon said stem and overlying said vents, air forced into said stem for inflating said cell unit being adapted to pass through said vents into the cell unit past the peripheral wall of said stem and said tubular member, the air within said cell unit pressing upon said tubular member maintains the same in close contact with the periphery of said stem for keeping said vents closed, said stem having a constricted mouth at one of its ends, a stopper, a spring bearing against said stopper for normally maintaining the same within said mouth, and means associated with said stopper whereby the latter may be manually disengaged from said mouth and against the tension of said spring for opening said mouth for deflating said cell unit.

3. In a pneumatic tire including an inflatable cell unit and an air-supply conduit, an inflation and deflation valve for said cell unit comprising a tubular stem having its inner end connected to said air conduit and having a constricted mouth at its outer end, a neck carried by and extending inwardly into said cell unit, means upon said stem for connecting the same to said neck, a plurality of vents in said stem, a resilient tubular member mounted upon said stem for closing said vents, air forced through said air conduit being adapted to enter said cell unit for inflating the same through said vents and past the wall of said stem and said tubular member, a spring-seated stopper normally closing the constricted mouth of said stem, and manually operable means for unseating said stopper and opening the constricted mouth of said stem for deflating said cell unit.

4. In a pneumatic tire including an inflatable cell unit, an inflation and deflation valve for said cell unit comprising a tubular stem having its inner end connected to said cell unit and having a constricted mouth at its outer end, said tubular stem being provided with a plurality of vents upon its periphery, a resilient tubular member mounted upon said stem and overlying said vents, air forced into said stem for inflating said cell unit being adapted to pass through said vents into the cell unit past the peripheral wall of said stem and said tubular member, the compressed air within said cell unit when the same is inflated pressing against said tubular member for maintaining the same in close contact with the periphery of said stem for maintaining said vents closed, a spring-seated stopper normally closing the constricted mouth of said stem, and manually operable means for unseating said stopper and releasing the air from the cell unit.

5. In a pneumatic tire including an inflatable cell unit, an inflation and deflation valve for said cell unit comprising a tubular stem, an air tight connection between said valve and said cell unit, valve means associated with said stem and operable by compressed air to permit passage of the latter into the cell unit for inflating the same, said valve means normally closing said stem for preventing escape of air from said cell unit, said stem having a constricted mouth, means for releasing the air from said cell unit for deflating the same, said last named means including a stopper, a spring for bearing said stopper against said mouth for maintaining the same closed, and a rod in association with said stopper whereby said stopper may be manually disengaged from said mouth against the tension of said spring for opening said mouth and deflating said cell unit.

JOSEPH STEINDEL.